United States Patent [19]
Heller et al.

[11] 3,851,702
[45] Dec. 3, 1974

[54] CONDENSATION APPARATUS FOR STEAM TURBINE PLANTS

[75] Inventors: László Heller; László Forgo; János Bódás, all of Budapest, Hungary; I. A. Alekszejev; G. Sz. Agejev, both of Moscow, U.S.S.R.

[73] Assignees: Tyeploelektroprojekt, Moscow, U.S.S.R.; Energiagazdalkodasi Intezet, Budapest, Hungary

[22] Filed: Oct. 24, 1972

[21] Appl. No.: 299,976

[30] Foreign Application Priority Data
Oct. 25, 1971   U.S.S.R............................ 1710034

[52] U.S. Cl.................... 165/110, 60/95 R, 62/305, 62/310, 165/125, 165/137, 261/DIG. 11
[51] Int. Cl............................ F28b 3/04, F28d 5/02
[58] Field of Search............. 60/95 R; 165/110, 137, 165/111, 112, 113, 114, 107, 129, 125; 261/DIG. 11, 153; 62/305, 310, 314

[56] References Cited
UNITED STATES PATENTS

| | | | |
|---|---|---|---|
| 3,322,409 | 5/1967 | Reed............................ | 261/DIG. 11 |
| 3,384,165 | 5/1968 | Mathews............................ | 165/122 |
| 3,495,655 | 2/1970 | Fordyce............................ | 165/122 |
| 3,498,590 | 3/1970 | Furlong............................ | 261/DIG. 11 |
| 3,608,873 | 9/1971 | Furlong............................ | 261/DIG. 11 |
| 3,635,042 | 1/1972 | Spangemacher............................ | 165/110 X |
| 3,685,579 | 8/1972 | Spangemacher............................ | 165/122 |
| 3,731,488 | 8/1973 | Sasakura............................ | 60/95 R |

OTHER PUBLICATIONS
Cecil, E. A. et al., "Research On Dry-Type Cooling Towers," EPA (Water Quality Office), Wash., DC (GPO), 11/1970 (TJ563R6, Vol. 1) pgs. 1 and 113 to 116.

*Primary Examiner*—Albert W. Davis, Jr.
*Attorney, Agent, or Firm*—Blum, Moscovitz, Friedman & Kaplan

[57] ABSTRACT

Steam turbine power plants employ condensers for condensing the dead steam withdrawing from the turbine. The condensers require cooling which is obtained by cooling water. This is, in turn, recooled by cooling towers one type of which works with surface heat exchangers cooled by air. Then, the condenser is of the mixing condenser type.

Where the employment of such system is jeopardised by the hazards of climatic conditions, the surface heat exchangers of the dry cooling tower may be provided with vertical ribs. A water spray serves for besprinkling the surface heat exchangers so that a water film will run down on the vertical ribs, thereby augmenting the cooling effect of the surface heat exchangers where, otherwise, they would fail to ensure a desired low condensation temperature in the mixing condenser.

4 Claims, 4 Drawing Figures

CONDENSATION APPARATUS FOR STEAM TURBINE PLANTS

This invention relates to condensation apparatus for steam turbine power plants.

As is known, the steam turbines of thermal and atomic power stations have, as a rule, surface condensers associated with them which have either cooling water either from natural sources or recooled water from evaporation coolers such as cooling towers, cooling lakes or contact spray basins introduced into them.

In case of evaporation coolers one portion of the water to be recooled becomes evaporated while another portion is carried away by flowing air in the shape of water droplets. Moreover, one portion of the water is regularly drained off in order to obviate undesired concentrations of salts dissolved in the circulated water.

The aforesaid water losses are compensated by introducing new amounts of water from suitable water sources. However, such balancing has recently met ever increasing difficulties due to water shortages at numerous places of the world.

In order to obviate such difficulties, so-called air condensation apparatus is rapidly gaining ground. With such apparatus, recooling of the condensate is obtained by means of air. The steam turbine of the power station has a mixing condenser associated with it which is operated with the condensate obtained in the mixing condenser from the dead steam withdrawing from the turbine and recooled in a cooling tower with natural or forced draught.

The air condensation apparatus operates without heat transmission by means of evaporation. Instead, a warming up of air takes place due to which much greater amounts of air are needed than in case of evaporation cooling towers. Furthermore, air condensation apparatus works without any loss of water. During summer, however, where the temperature of the ambient air is considerably increased, air condensation cooling towers are generally unable to provide a suitably low condensation temperature although their dimensions and investment costs considerably exceed those required by so-called wet towers.

The main object of the present invention is to obviate such inconveniences and to provide a condensation apparatus for steam turbine power stations wherein steam is condensed by means of the condensate recooled by air as long as the ambient air temperature is suitably low. If, however, a desired steam condensation temperature cannot be obtained by recooling by means of air alone, in addition to cooling by means of air also an economic cooling by means of water will be employed. It means that even in hot seasons a considerably lower steam condensation temperature, and thereby, a higher turbine efficiency can be obtained without the dimensions and the investment costs exceeding the corresponding values of conventional condensation cooling towers.

Thus, the invention is concerned with a condensation apparatus which comprises, in a manner known per se, a mixing condenser and air cooled heat exchangers arranged in a cooling tower for cooling a condensate coming from said mixing condenser. In compliance with the main feature of the present invention, the heat exchangers are provided with vertically disposed ribs, arranged radially with respect to or enclosing an angle with the radius of the cooling tower. Thereby, it is rendered possible that a continuous water film is formed on the surface of the ribs which flows downwards and originates in water sprayed from above onto the heat exchangers. The downwardly running water film extracts the heat from the ribs of the heat exchangers and transmits it, in addition to convection, also by evaporation to the air flowing horizontally between the ribs whereby heat transmission is rendered considerably more vigorous.

The water film will cover the entire surface of the ribs and will be suitably thin so that undesired thermal resistance between ribs and air flow is obviated. The amount of downwardly running water will considerably exceed the water losses due to evaporation so that an undesired concentration of salts and a deposition of scale due thereto may be obviated. Such requirements can be met by a water amount of 150 to 300 kilograms per hour reckoned for current meters of horizontal rib projection from one side.

The cooler for the condensate and more particularly the heat exchangers and the air supply means will preferably be sized such that a suitably low steam condensation temperature will be obtained during winter even in case of maximum power station loads without the necessity of serving the heat exchangers with water spray.

In case of temperatures below zero, temperature difference in the range of 35° to 45° centigrade between condensate and air can be permitted without deterioration of the turbine efficiency. Thereby, economic sizes of the heat exchangers and the air supply means are considerably smaller than with conventional air condensation systems which are sized, as a rule, for the yearly mean temperature of ambient air.

In case of ambient air temperatures above zero degrees centigrade, providing the heat exchangers with water spray may still be dispensed with if the power station does not work under maximum load as will be the case by night or on days of rest. The heat exchangers will be sprayed with water only where the air temperature and the load of the power station considerably increase and air condensation is already not sufficient enough for providing suitably low condensation temperatures. Even then, water spraying will take place only according to the needs of the system. All heat exchangers will be operated only in case of maximum loads at correspondingly high ambient air temperatures.

The water spray will automatically be controlled. At the connections of spray devices to water supply lines for individual heat exchangers or groups of heat exchangers control means are provided by which the water supply to the individual parts of the cooling apparatus may be switched on or cut off dependent on the temperature of the condensate or on the pressure prevailing in the condenser of the turbine.

Thus, the condensation apparatus according to the invention permits to constantly maintain a high turbine efficiency while consuming minimum amounts of water by evaporation, the amount of water being reduced or increased in dependence of weather conditions and power station loads. Moreover, the air flow which traverses the cooling tower with natural draught is entirely made use of in contrast to so-called wet cooling towers and known air condensation apparatus wherein the air flow across the cooling tower is intentionally reduced.

Condensation apparatus of the aforesaid type are e.g., particularly suitable to be employed at higher latitudes and at highly continental climates since, there, the water losses, reckoned for the yearly average value, may be reduced to a third or fourth part of corresponding losses in wet cooling towers whereby the turbine efficiency is increased by at least 0.5 per cent without any increase of investment costs of the condensation apparatus.

Furthermore, the condensation apparatus according to the invention is distinguished from the known condensation apparatus of the wet cooling tower type by that, in winter time with air temperatures below zero, it is dry air rather than wet air which traverses the cooling tower whereby freezing up within the cooling tower and its surroundings may be obviated. Therefore, such towers may have a less heavy construction.

The employment of the condensation apparatus according to the invention offers special advantages if the power staton is situated in the proximity of the quarry of fuel and the consumers of electric energy while water sources will be used for supplying water the capacity of which may be lower than in case of the known condensation apparatus provided with evaporation coolers.

The heat exchangers for the condensate will have several flows on the water side and the condensate will be supplied to the last vertical row of pipes as regards the air flow direction whereas the cooled down condensate will be withdrawn from the first rows of pipes. Then, the ribs will show various temperatures in the horizontal direction which increase in the direction of air flow.

Upon the heat exchangers being besprinkled, the temperature of the running down water film will be slightly lower than the temperature of the rib at a certain point. The temperature of the water film will likewise increase in the direction of the air flow. Thus, a basin disposed on the side of the air inlet will receive the coldest water which may be used in auxiliary equipments of the power station requiring cooling water such as oil and gas coolers. For this purpose, the area of the water collecting basin which receives the coldest water is, preferably, confined by a partition between the side walls of the basin and is connected to the suction line of a supply pump for supplying the water e.g., to the aforesaid oil- and gas coolers of the power station. In this connection, it may be pointed out that in case of known air condensation apparatus the oil and gas coolers need a special source of cooling water to cover their water requirements or else a recooling apparatus with an evaporation water cooler.

Furthermore, it is known that the cooling effect of the heat exchangers associated with cooling towers with natural draught is considerably reduced by strong winds which entail a decrease of the draught. Such inconvenience can be obviated by entailing a spiral or helical air flow in the cooling tower. For this purpose, the otherwide vertically arranged ribs of the heat exchangers will be disposed at an angle with respect to the radius of the cooling tower with natural draught. However, it is possible to employ flow control means downstream the heat exchangers by which the air flow is given a spiral or helical motion.

Further details of the invention will be described by taking reference to the accompanying drawings which show, by way of example, various embodiments of the condensation apparatus according to the invention, and in which.

Same reference characters refer to similar details throughout the drawings.

Figure 1:
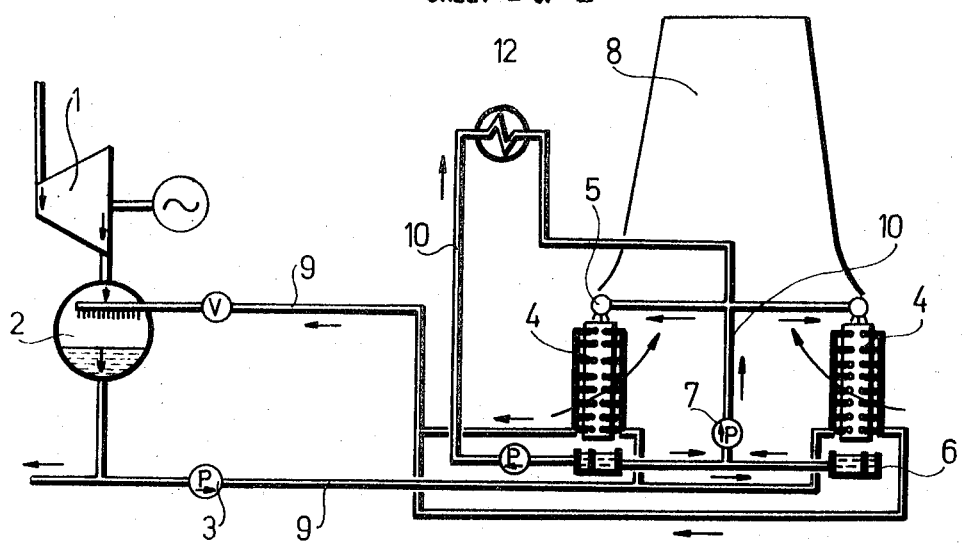
FIG. 1 is a diagrammatic view showing the working principle of the condensation apparatus according to the invention.

In the drawings, FIG. 1 shows a steam turbine 1 with a mixing condenser 2 which is connected through a circulation pump 3 in a pipe conduit 9 with air cooled surface heat exchangers 4. The latter are disposed in an air inlet passage of a cooling tower 8. The heat exchangers 4 have a water collecting basin 6 arranged therebelow which is connected through a pipe conduit 10 with an oil or gas cooler 12.

The pipe conduit 10 comprises a circulation pump 7 which serves for supplying water into water distributors 5 arranged above the heat exchangers 4. Another pump 11 serves for supplying water into the oil or gas cooler for auxiliary equipment 12.

In operation, the dead steam of the turbine 1 flows into the mixing condenser 2 where it is condensed by means of injected condensate which is supplied through the pipe conduit 9 and an unspecified control means. The condensed steam is transferred in the form of a condensate by the circulation pump 3 through the lower branch of the pipe conduit 9 to the air cooled surface heat exchangers 4. The warm condensate traverses the pipes of the latter and returns through the upper branch of the pipe conduit 9 and the unspecified control means into the mixing condenser 2 where it is injected into the introduced dead steam transforming it into a warm condensate to be supplied again to the heat exchangers 4.

If the ambient temperature is so high that the air flow traversing the cooling tower 8 with natural or forced draught is unable to suitably cool down the condensate which traverses the heat exchangers 4, the circulation pump 7 will be started so that water will be supplied from the water collecting basin 6 through the pipe conduit 10 to the water distributors 5 which besprinkle the surface heat exchangers 4. The water running down in the form of a film along the ribs not shown in FIG. 1 is collected in the water collecting basin 6 while the surface heat exchangers 4 are additionally cooled by the downwardly passing water film.

The pump 11 supplies water from the water collecting basin 6 to the oil or gas cooler 12 wherefrom the water likewise flows to the water distributors 5 as indicated by arrows in FIG. 1.

Figure 2:
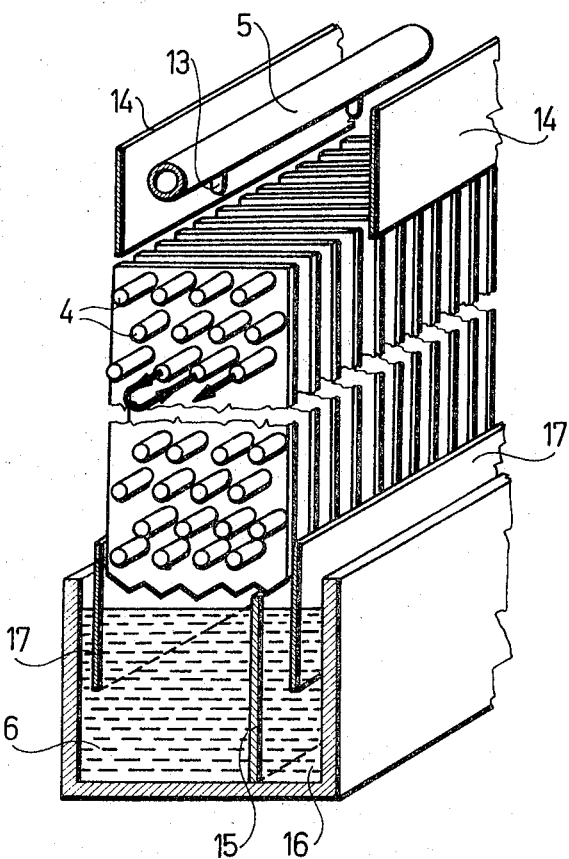
FIG. 2 shows a perspective view of a detail.

FIG. 2 shows a perspective view of a detail of a surface heat exchanger 4. It will be seen that the pipes of the heat exchanger 4 are provided with vertically arranged ribs 4a while the water distributor 5 is equipped with sprinkler heads 13. Protective plates 14 prevent water droplets from being carried away by the air flow above the heat exchanger 4 by interrupting the flow path of cooling air at the desired places. Similar protective plates 15 are disposed below the heat exchanger 4 in the water collecting basin 6. The coldest water is collected in a chamber 16 between the walls of the basin and a partition 15.

Air flow is interrupted below the heat exchanger 4 by a protective plate 17.

In operation, the condensate flows through the horizontal pipes of the heat exchanger 4 as indicated by arrows. Furthermore, water is discharged from the water distributor 5 through the sprinkler heads 13 in order to moisten the vertical ribs on the horizontal pipes of the heat exchanger 4. The running down water forms a thin water film and collects in the water collecting basin 6 with the coldest water in the chamber 16 since the pipes on this side of the heat exchanger carry already cooled down condensate so that the cold air entering in a direction indicated by arrow 27 will be warmed up but slightly while the running down water has to carry away the least amount of heat.

Figure 3:
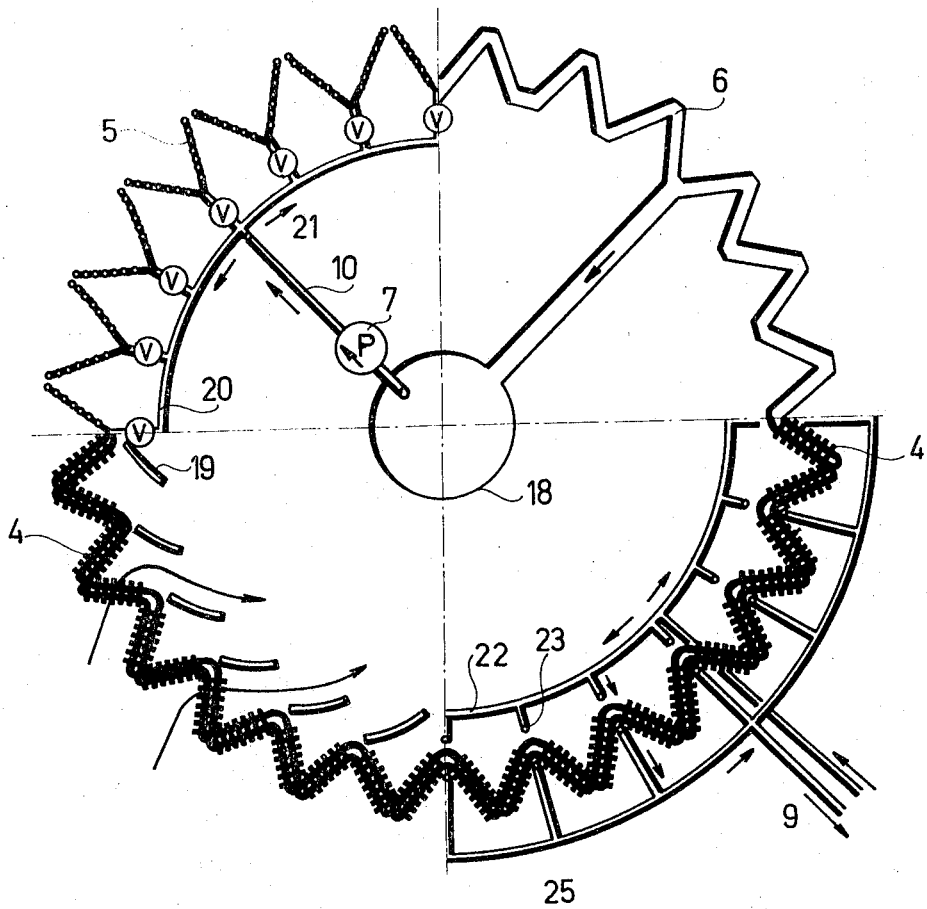
FIG. 3 represents various sectional views of a detail.

FIG. 3 represents horizontal sectional views of the heat exchanger 4 at various levels. Reference character 18 designates a chamber connected with the water collecting basin 6 by means of an unspecified radial channel. The pipe conduit 10 connects the chamber 18 with a circular distributor conduit 20 which, in turn, is connected through control means 21 with the above mentioned water distributors 5. A further pipe conduit 22 serves for distributing the condensate which is supplied into the individual heat exchangers 4 through distributor pipes 23, and is discharged through discharge pipes 24 and discharge conduit 25.

In operation, the condensate flows through the pipe conduit 9 to the pipe conduit 22 from which it flows through the distributor pipes 23 into the individual heat exchangers 4. In the pipes of the heat exchangers 4 the warm condensate is cooled down by the air flow indicated by arrows whereafter the cooled down condensate is discharged through discharge pipes 24 and discharge conduit 25. From the latter, the cooled down condensate is supplied through the pipe conduit 9 again into the mixing condenser 2 not shown in FIG. 3.

On the other hand, circulation pump 7 supplies water from the chamber 18 through the pipe conduit 10 and the control means 21 into the water distributors 5 from which the water flows through the sprinkler heads 13, not shown in FIG. 3, onto the ribs of the heat exchangers 4. The running down water is collected in the water collecting basin 6 the shape of which corresponds, in the instant case, to the profile of the heat exchangers 4 as is apparent from the upper right-hand part of FIG. 3. Eventually, the running down water flows from the water collecting basin 6 back into the chamber 18.

Where the distributor pipe conduit 20 and the distributors 5 meet, control means 21 are provided which can individually be adjusted and controlled so that an additional cooling by means of water will be employed in correspondance with actual requirements.

Reference character 19 designates the air baffle plates by means of which a spiral- or helical progression is imparted to the inflowing air.

Figure 4:
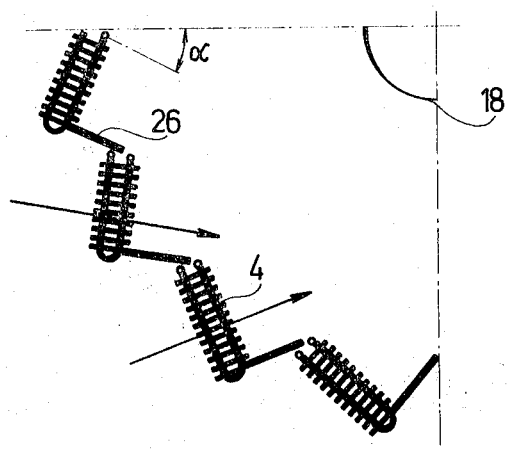
FIG. 4 is a cross-sectional view of a detail of a further exemplified embodiment.

The exemplified embodiment illustrated in FIG. 4 is distinguished over the previous one in that the vertically disposed ribs of the heat exchangers 4 enclose an angle with the radius of an associated cooling tower not shown. This means that the spiral or helical motion of the air is obtained without the baffle plates 19 of the previously described embodiment. Reference character 26 designates walls which prevent an air flow between adjacent heat exchangers 4.

Hereinbefore, the invention has been described in connection with condensation apparatus which were associated with steam turbines. However, it is possible to use the vapours of other substances as well if the respective freezing points and evaporation temperatures are in suitable accordance with prevailing weather conditions.

What we claim is:

1. A condensation apparatus for a steam turbine station comprising, in combination, a mixing condenser, a first pipe conduit, surface heat exchangers connected with said mixing condenser by said first pipe conduit, air supply means for cooling said surface heat exchangers by means of air, a first circulation pump in said first pipe conduit for supplying condensate from said mixing condenser to said surface heat exchangers, vertically disposed ribs on said surface heat exchangers, individual water distributor spray means above said vertically disposed ribs consisting of a water distributor and sprinkler heads, a water collecting basin beneath said surface heat exchangers, a second pipe conduit for returning water from said surface heat exchangers to said mixing condenser, a second circulation pump, a third pipe conduit connecting said water collecting basin with the suction line of said second circulation pump the pressure line of which is connected to said water distributor spray means, cooler means for auxiliary equipment, a fourth pipe conduit having therein a third circulation pump for circulating water from said water-collecting basin to said cooler means, a common distributor conduit for distributing water from said cooler means to said water distributor spray means, individual control means provided at the connections between said individual water distributor spray means and said common distributor conduit for switching on and off a water flow to said water distributor spray means dependent on condensation temperatures and pressures prevailing in said mixing condenser, the ambient temperature and the load on said power station, said pipe conduits, circulating pumps, and water distributor spray means being sized and said control means being set to provide downwardly running water over said vertically disposed ribs in an amount sufficiently exceeding evaporation losses so that formation of scale on said ribs is avoided.

2. A condensation apparatus for a steam turbine power station comprising, in combination, a mixing condenser, a first pipe conduit, surface heat exchangers connected with said mixing condenser by said first pipe conduit, air supply means for cooling said surface heat exchangers by means of air, a first circulation pump in said first pipe conduit for supplying condensate from said mixing condenser to said surface heat exchangers, vertically disposed ribs on said surface heat exchangers, individual water distributor spray means above said vertically disposed ribs consisting of a water distributor and sprinkler heads, a water collecting basin beneath said surface heat exchangers, a second pipe conduit for returning water from said surface heat exchangers to said mixing condenser, a second circulation pump, a third pipe conduit connecting said water collecting basin with the suction line of said second circulation pump the pressure line of which is connected to said water distributor spray means, cooler means for auxiliary, a fourth pipe conduit having therein a third circulation pump for circulating water from said water collecting basin to said cooler means, a common distributor conduit for distributing water from said cooler means to said water distributor spray means, individual control means provided at the connections between said individual water distributor spray means and said common distributor conduit for switching on and off a water flow to said water distributor spray means dependent on condensation temperatures and pressures prevailing in said mixing condenser, the ambient temperature and the load on said power station, a partition in said water collecting basin, a chamber in said water collecting basin defined by said partition and the walls of said basin, said chamber being located at the air inlet side of said air-cooled surface heat exchangers and being connected with the suction line of said third circulation pump the pressure line of which is connected to said cooler means for auxiliary equipment of said power station.

3. In a condensation apparatus as claimed in claim 2 the further improvement of said surface heat exchangers being associated with a cooling tower with natural draught and the ribs of said surface heat exchangers being arranged at an angle with respect to the radius of said cooling tower.

4. In a condensation apparatus as claimed in claim 2 the further improvement of said surface heat exchangers being associated with a cooling tower of natrual draught, air baffle plates being provided downstream said surface heat exchangers for imparting a spiral motion to an air flow traversing said surface heat exchangers.

* * * * *